Figure 1:
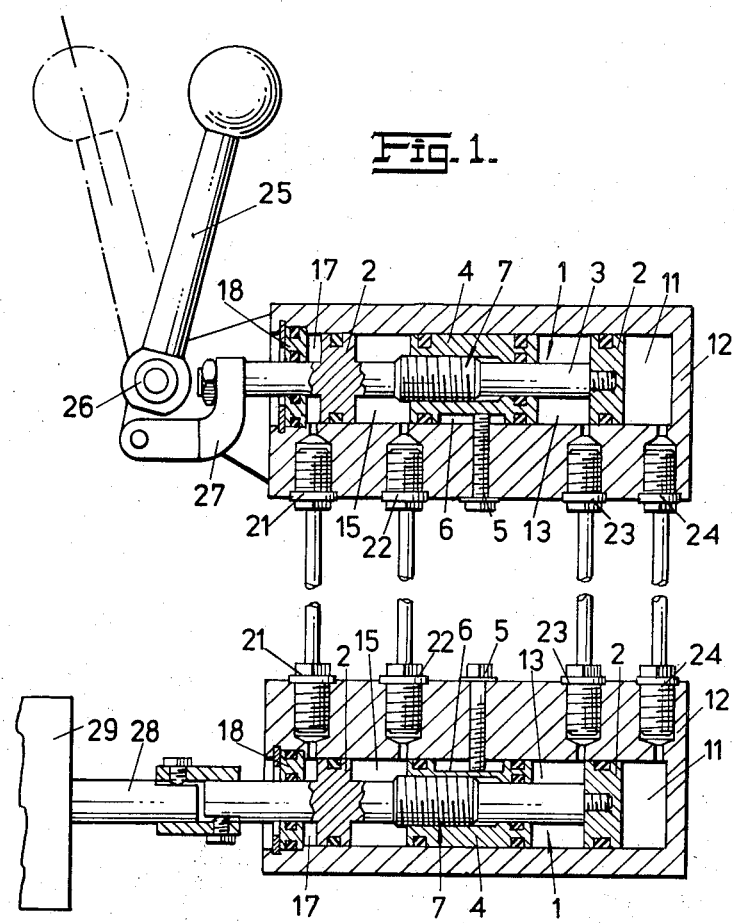

United States Patent [19]
Ogilvie

[11] 3,823,651
[45] July 16, 1974

[54] HYDRAULIC ASSEMBLIES
[75] Inventor: Martin Bruce Ogilvie, Yardley Wood, England
[73] Assignee: Girling Limited, Birmingham, England
[22] Filed: July 26, 1972
[21] Appl. No.: 275,350

[30] Foreign Application Priority Data
Aug. 6, 1971  Great Britain.................... 37051/71

[52] U.S. Cl. ................................................. 92/2
[51] Int. Cl............................................ F01b 21/00
[58] Field of Search........ 60/54.5 E, 54.6 E, 54.6 R; 92/2, 31, 33; 91/61; 173/108

[56] References Cited
UNITED STATES PATENTS
1,173,326   2/1916   Taylor................................... 92/31
2,918,799   12/1959  Geyer..................................... 92/2

Primary Examiner—Edgar W. Geoghegan
Assistant Examiner—A. M. Zupcic
Attorney, Agent, or Firm—Scrivener Parker Scrivener & Clarke

[57]  ABSTRACT

A repeater transmission comprises two similar hydraulic assemblies and transmits both linear and rotary movement. In each assembly, there is a first piston immovable on a piston rod and a second piston engaged with the piston rod by a fast-thread arrangement such that axial movement of the second piston along the rod causes the rod to rotate and rotation of the rod causes the second piston to move along the rod.

In a second embodiment, the second piston is engaged non-rotationally with, but slidably on, the rod and is engaged with an internally fast-threaded collar which is non-rotational in the cylinder.

5 Claims, 2 Drawing Figures

HYDRAULIC ASSEMBLIES

The present invention relates to a hydraulic assembly especially for use with a like assembly to provide a repeater transmission.

Rear engined cars, such as racing cars, present a problem in connecting gear change controls to gear boxes. The controls have to move input shafts of the gear boxes both axially and angularly. Similar problems arise elsewhere. Solutions to this and like problems involve mechanical linkages or other forms of connection. Mechanical linkages are wear-prone and require frequent adjustment as well as being space demanding. Electrical connections can be a cause of catastrophic failure. Hydraulic connections are usually bulky.

According to the present invention in one aspect, a hydraulic assembly comprises a housing defining a cylinder, first and second pistons within the cylinder, a pistron rod on which the first piston is axially immovable, the first piston being slidable along the cylinder, and first and second means connecting the second piston respectively to the housing and the piston rod, one of said means being a screw threaded engagement means and the other an anti-rotation means, the assembly being so arranged that movement of the piston rod axially causes axial movement of the first piston and so that rotary movement of the rod causes axial movement of the second piston and the assembly also being such that axial movement of the second piston causes rotation of the rod.

There may be more than one first and/or second pistons.

Another aspect of the invention provides a hydraulic transmission comprising two similar hydraulic assemblies, each assembly having a housing defining a cylinder in which two pistons are axially slidable, the pistons being on a common piston rod and a first of the pistons being axially immovable on the rod and a second of the pistons being non-rotational in the cylinder and being engaged with the rod by a screw threaded engagement means which is such that rotation of the rod causes axial movement of the second piston and axial movement of the second piston causes rotation of the rod, and the transmission also comprising hydraulic connection means including port means in the two assemblies for transmitting signals from one assembly to the other.

An embodiment of the invention will now be described, by way of example with reference to the accompanying drawings.

THE DRAWINGS

Figure 2:
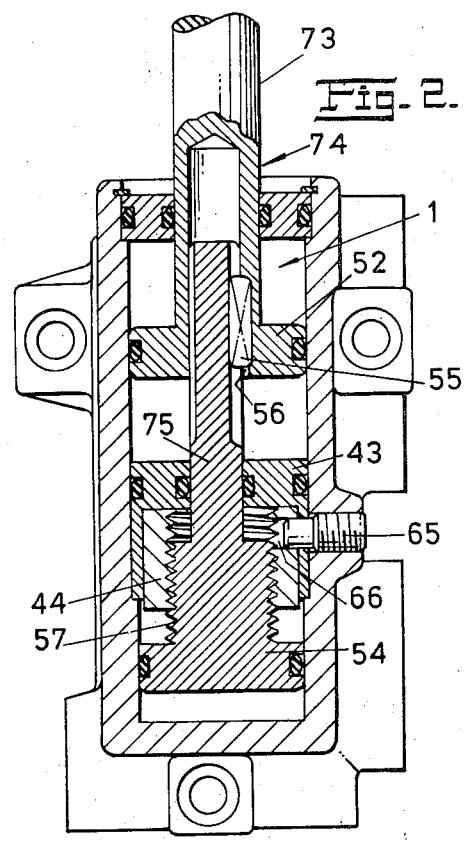

FIG. 1 shows the interconnection of two hydraulic assemblies to form a hydraulic repeater transmission, and FIG. 2 shows a different arrangement of an assembly.

In FIG. 1, each assembly has a housing defining a cylinder 1, a set of two first pistons 2, a piston rod 3 on which the first pistons are axially and rotationally immovable, and a second piston 4 which is constrained against rotation in the cylinder by a bolt or like keying means 5 in the cylinder wall engaging in a slot 6 in the second piston. The second piston engages the rod by fast-thread engagement means 7 such that the piston 4 will move axially with the rod in the absence of rod rotation and will move axially in relation to the rod if the rod is rotated and axial relative movement of the piston along the rod will cause rod rotation.

A chamber 11 is formed between a cylinder end wall 12 and the right-hand one of the first pistons; another chamber 13 between the said right-hand one of the pistons 2 and the second piston 4; a third chamber 15 between the second piston 4 and the left-hand one of the pistons 2; and a fourth chamber 17 between the said left-hand one of the pistons 2 and a cylinder end closure 18.

The chambers in the two assemblies are interconnected each chamber to the identically numbered chamber of the other assembly by connections between port means 21, 22, 23, and 24.

The upper assembly is the master and the lower the slave in a repeater mechanism or transmission. To this end the piston rod of the upper assembly is angularly and axially displaceable by a gear lever 25 which is mounted by means of a ball-and-socket 26 disposed on the axis of the piston rod and which transmits its movement to the piston rod by a link 27. The gear lever is moveable between positions selecting the various "gears" and in so moving passes through neutral.

The lower of the two assemblies is connected to the input shaft 28 of a gear-box 29.

When the piston rod of the upper assembly is moved to the right without any rotation thereof, the chamber 11 is reduced in size and the chamber 17 increased; hydraulic fluid is forced into the chamber 11 of the lower assembly and drawn from the chamber 17 of the lower assembly so that the gear-box input shaft 28 executes a linear non-rotational movement corresponding to that of the top end of the gear lever 25. The chambers 13 and 15 do not change their size unless there is rotation of the piston rod of the upper assembly causing the second piston to move axially along the rod. If rotation of the rod of the upper assembly occurs, the upper assembly's chambers 13 and 15 alter in size causing a corresponding alteration of the sizes of the chambers 13 and 15 of the lower assembly and rotation of the rod of the lower assembly.

In the construction of FIG. 2, the cylinder 1 of the housing is divided into two sub-cylinders by a fixed partition 43. A first piston 52 is mounted on a main part 73 of a two part rod 74 and a second piston 54 on a second part 75 of the rod, the two parts being splined together so that they rotate as one by means of a key 55 and a key-way 56. The second piston is integral with the second part of the rod and so it too rotates with the two part rod 74.

An internally fast-threaded collar 44 is retained immovably in the lower of the two sub-cylinders by means of a bolt 65 in a hole 66 through the housing wall and the collar. The internal fast thread is indicated in FIG. 2 by reference numeral 57. The assembly operates very similarly to those described in relation to FIG. 1.

Hydraulic port means are of course provided to transmit signals between two assemblies as illustrated in FIG. 2.

Many adaptations of the invention are of course possible. The described embodiments give push-pull signals between the two assemblies whereas a single signal is necessary and adequate to transmit the same information.

By the use of the present invention, a compact transmission of both rotary and linear movement is provided with highly flexible interconnections in the form of pipes and using a single assembly at each end of the transmission. The assemblies at the two ends can be identical so saving storage and manufacturing expense.

I claim:

1. A hydraulic assembly comprising a housing defining a cylinder, first and second pistons within the cylinder, a piston rod on which the first piston is axially immovable, the first piston being slidable along the cylinder, and first and second means connecting the second piston respectively to the housing and to the piston rod, one of said means being a reversable screw-threaded engagement means and the other anti-rotation means disposed to prevent rotation of the second piston with respect to the piston rod while allowing axial movement of the second piston along the piston rod, the assembly being so arranged that movement of the piston rod axially causes axial movement of the first piston and so that rotary movement of the rod causes axial movement of the second piston, and the assembly also being such that axial movement of the second piston causes rotation of the rod.

2. A hydraulic assembly according to claim 1, wherein the screw-threaded engagement means is between the second piston and the piston rod with the anti-rotation means being between the second piston and the cylinder's wall.

3. A hydraulic assembly according to claim 1, in which the cylinder is divided into sub-cylinders by a stationary partition and wherein the first piston is in one sub-cylinder and the second piston in a second.

4. A hydraulic assembly according to claim 1, wherein there is a pair of first pistons defining between themselves a sub-cylinder in which the second piston is movable.

5. A hydraulic assembly according to claim 1 wherein the screw-threaded engagement means connects the second piston to the housing and the anit-rotation means connects the second piston to the piston rod.

* * * * *